United States Patent
Genova et al.

(10) Patent No.: US 9,018,914 B2
(45) Date of Patent: Apr. 28, 2015

(54) LOW SIDE NMOS PROTECTION CIRCUIT FOR BATTERY PACK APPLICATION

(71) Applicant: Maxim Integrated Products, Inc., San Jose, CA (US)

(72) Inventors: Angelo Genova, Delia (IT); Urs Harald Mader, Cupertino, CA (US); Marvin L. Peak, Jr., Highland Village, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 243 days.

(21) Appl. No.: 13/661,781

(22) Filed: Oct. 26, 2012

(65) Prior Publication Data

US 2014/0301005 A1    Oct. 9, 2014

(51) Int. Cl.
*H02J 7/00*    (2006.01)
*H02J 7/04*    (2006.01)

(52) U.S. Cl.
CPC ........................................ *H02J 7/00* (2013.01)

(58) Field of Classification Search
USPC ........................................................ 320/5, 107
See application file for complete search history.

(56) References Cited

U.S. PATENT DOCUMENTS

2011/0267726  A1*  11/2011  Ikeuchi et al. .................. 361/63

* cited by examiner

*Primary Examiner* — Dharti Patel
(74) *Attorney, Agent, or Firm* — North Weber & Baugh LLP

(57) ABSTRACT

An electric circuit comprising means for communicating with an external device coupled to means for measuring the charge condition of an external battery. In some embodiments, the circuit comprises at least one level shifter for changing the reference voltage of communication signals. In some embodiments, the circuit comprises a first driver and a second driver for driving external switching elements for the controlled charge and discharge of the battery.

18 Claims, 3 Drawing Sheets

LOW SIDE NMOS PROTECTION CIRCUIT FOR BATTERY PACK APPLICATION

BACKGROUND

A. Technical Field

The present invention relates to the field of battery monitoring integrated circuits. More specifically, the present invention relates to integrated circuits integrating battery pack protection with functions that require communication with the battery such as fuel gauging or external pack voltage, current and temperature monitoring.

B. Background of the Invention

Integrated battery monitor circuits protect against over voltage and under voltage conditions and they maximize battery life between charges, minimize charging times, and improve overall battery life. Batteries for some PDAs, MP3s, Digital Cameras, and Laptops for example have integrated battery monitor circuits designed within them that ensure that the deliverance of reliable power is properly managed. Without these battery monitor integrated circuits even fine-tuned handhelds will exhibit problems, such as over voltage, and under voltage conditions. Incidentally, overcharging is potentially a very dangerous problem. Overcharging is the state of charging a battery beyond its electrical capacity, which can lead to a battery explosion, leakage, or irreversible damage to the battery. It may also cause damage to the charger or device in which the overcharged battery is later used.

Battery monitor integrated circuits offer other key benefits as well, including maximizing battery life between charges, minimizing charging times, and improving battery life. Another aspect of battery monitor integrated circuits is their functioning design to detect and monitor voltage levels in batteries. When certain parameter thresholds are exceeded or dangerous conditions exist, these monitoring circuits react through either an external or internal control mechanism to protect the monitored batteries and correct problems as programmed. Monitoring circuits are known by a variety of names, including battery monitors, battery protection circuits, and battery fuel-gauge circuits and may include battery charging circuits and reset circuits.

Generally, monitoring circuits use either a high side PFET transistor or high side NFET transistors as switches or pass devices. Due to their size and current requirements, the PFETs or NFETs are external to the monitoring circuit, and each topography has inherent benefits and drawbacks.

FIG. 1A is an example of a high side battery charging and discharging system 100 having a monitoring circuit 103. In this example, the switching devices are PMOS transistors 101 and 102 and are referenced to a bulk power source such as PACK+ 107. As mentioned previously, the PMOS switches 101 and 102 are external to the circuit 103 due to their size and current handling requirements.

Generally, the circuit 103 is put in place to monitor two fault conditions: when an excess amount of current is flowing into the positive terminal of the battery 106 and when an excess amount of current is flowing into the negative terminal of the battery 106. The fault conditions may occur as a result of age related degradation of circuitry, a short across the bulk power source, or any number of reasons.

In a fault condition where excess current is flowing into the positive terminal of the battery 106, the circuit 103 is able to detect the excess current by measuring the voltage across the two PMOS switches 101 and 102 and comparing the voltage to a predetermined threshold. If the voltage exceeds the threshold, a charge driver 104 disables PMOS 101. A circuit starting at PACK+ 107, through the two PMOS switches 101 and 102, the battery 106 to PACK− 108 is broken. Furthermore, a parasitic diode within PMOS 101 (not shown) becomes reverse biased and stops all current flow, save for any leakage current, into the positive terminal of the battery 106.

In a fault condition where excess current is flowing into the negative terminal of the battery 106, the circuit 103 is similarly able to detect the excess current by measuring the voltage across the two PMOS switches 101 and 102 and comparing the voltage to a predetermined threshold. A discharge driver 105 disables PMOS 102 and the same circuit described above is broken. Also, a parasitic diode within PMOS 102 becomes reverse biased and all current flow into the negative terminal of the battery 106 is halted.

As mentioned above, the system 100 in FIG. 1A suffers from increased cost due to the use of PMOS transistors as switches. Inherently, PMOS transistors suffer lower carrier mobility and therefore must be 2.8 times larger than a corresponding NMOS transistor in order to have identical current sinking or sourcing capability. As a result, the use of PMOS transistors may add unacceptable cost to a system where cost is a critical parameter.

FIG. 1B shows a battery protection system 120 having an alternate topography to the system 100 shown in FIG. 1A. The system 120 utilizes NMOS transistors 121 and 122 referenced to a bulk power source such as PACK+ 127. In the system 120, a monitoring circuit 123 comprises a discharge driver 124 and a charge driver 125 as shown in the figure and described below. The monitoring circuit 123 is coupled to a battery 126.

The system 120 operates in a very similar fashion to the system 100 in FIG. 1A. If there is excess current flowing into the battery 126, the NMOS 122 is disabled by the charge driver 125. Likewise, if there is an excess current flowing out of the battery 126, the discharge driver 124 disables the NMOS 121.

However, in this topography, the potential of the gates of both NMOS devices 121 and 122 are, in general, higher than or equal to potential PACK+ 127 or the battery 126. It is well known that in order to be driven on, the gate of an NMOS device must be at a higher potential than the source. Therefore, in order to apply a greater voltage such as to turn the devices on, a charge pump 133 is required. A charge pump is an electronic circuit that uses capacitors (not shown) as energy storage elements to form either a higher or lower voltage power source. Typical charge pump circuits are capable of high efficiencies, sometimes as high as 90%-95%, while being topologically simple circuits. Charge pumps use some form of switching device, such as a MOSFET (not shown), to control the connection of voltages to the capacitor. For instance, to generate a higher voltage, a first stage involves the capacitor being coupled across a voltage and charged up. In a second stage, the capacitor is disconnected from the original charging voltage and coupled with a negative terminal which is coupled to the original positive charging voltage. Because the capacitor retains the voltage across it (ignoring leakage effects) the positive terminal voltage is added to the original voltage, effectively doubling the voltage. The pulsing nature of the higher voltage output is typically smoothed by the use of an output capacitor (not shown).

Despite the simple and efficient nature of a charge pump, it has inherent drawbacks. First, the charge pump=s circuit is high voltage and low current, which requires large resistor and high-voltage device area, thereby adding a significant amount of cost. Furthermore, the energy storage elements, generally a capacitor and additional output capacitor, are external to the circuit 123. As a result, unacceptable assembly costs are added and the storage elements are added to the total bill of materials of the end system.

FIG. 1C shows yet another topography of a system 140 for monitoring a battery 146. The system 140 comprises a monitoring circuit 143 and two NFET devices 141 and 142. In this topography, known as low side protection, the source of the NFET 142 is coupled to the low side of the battery 146 and the source of the NFET 141 is coupled to PACK− 149. The drains of the NFETs 141 and 142 are coupled together. Because the sources and drains of both the NFETs 141 and 142 are at a lower potential than their respective gates, no charge pump is needed to drive the NFETS 141 and 142 in order to turn them on and facilitate the flow of current from PACK− 149 to the low side of the battery 146. The system 140 is able to benefit from using less costly NFET devices while avoiding the prohibitive expense of a charge pump and the necessary external energy storage elements.

However, the topography of the system 140 also has an inherent flaw. The monitoring circuit 143 still must communicate with an external control chip or AC adaptor (not shown) through a communication bus 147. During the usage of system 140, NFET 141, 142 or both may be placed in an open condition. As a result, direct connections to digital control signals received through the communication bus 147 may not be correctly referenced to ground. This error may cause false 1s and 0s to be sensed by the circuit 143. Further, under certain conditions, the inherent devices in circuit 143 can provide an alternate connection between signals 149 and 151. This alternate connection is outside of the control of devices 141 and 142; resulting in an undesirable or even hazardous condition for battery 146. To that end, device 143 is typically isolated from the communication bus 147; limiting available functions for integration with a low side protection topology.

SUMMARY OF THE INVENTION

Various embodiments of the invention address the errors and hazards in communication between an external control device and a monitoring circuit arranged in a low side protection topography with NMOS switching devices. The monitoring circuit is arranged in two sections. Each section has a voltage level shifter for changing the reference voltage that a section is biased to. The voltage level shifters enable a user to set the reference level of an incoming control signal to the monitoring circuit. As a result, the incoming signals are properly communicated to the monitoring circuit regardless of the state of the protection devices.

In one aspect of the invention, a system for monitoring a battery pack comprises a battery monitor IC that controls two NMOS switching devices that define a current path from the negative terminal of the battery to a negative supply rail. The system also comprises a sensor for determining the current flow in and out of the battery pack. In some embodiments, a resistor of a known impedance in series with the battery pack is measured for voltage, thereby determining the current flowing through the battery pack. In order to enable communications while remaining referenced to a negative supply rail, a level shifter is provided for shifting the level of incoming communication signals.

In another aspect of the invention, an integrated circuit for monitoring the charge of a battery comprises a sensor for determining the charge of the battery, ports for coupling a first and second NFET, communication means for communicating with an external device and a circuit for referencing a communication signal to a desired reference voltage. Preferably, the communication means is referenced to the negative terminal of the battery pack. The integrated circuit further comprises a level shifter for shifting a voltage level of the communications signal.

Although NFETs are described herein, a person of ordinary skill having the benefit of this disclosure will recognize that any switching device, including but not limited to MOSFETs, JFETs, bipolar transistors, IGBTs, or the like. In operation, what is achieved is a single IC solution enabling low side NMOS protection in battery monitoring systems without sacrificing a digital communications interface.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1A:
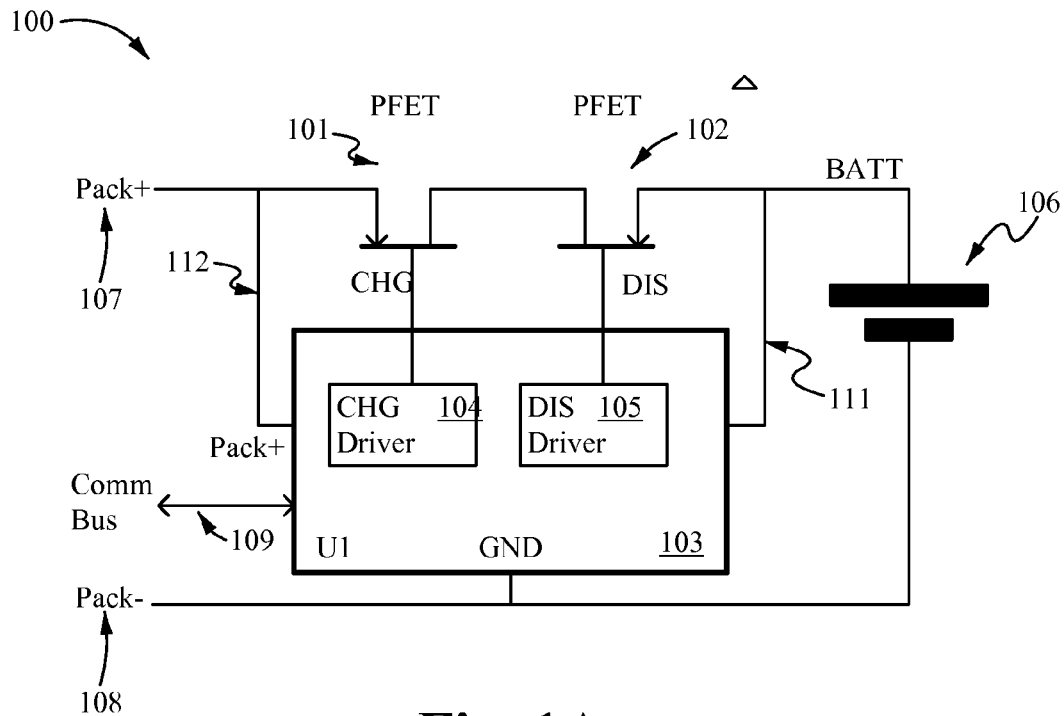
FIG. 1A shows first prior art schematic diagram of a monitoring circuit.
Figure 1B:
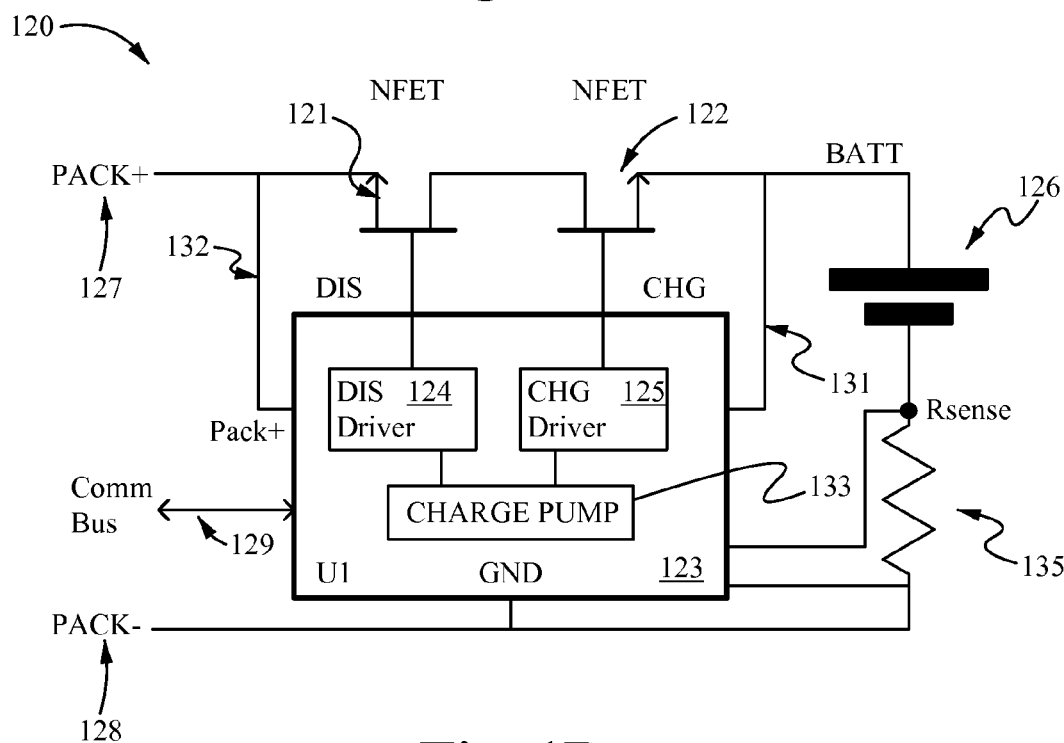
FIG. 1B shows a second prior art schematic diagram of a monitoring circuit.
Figure 1C:
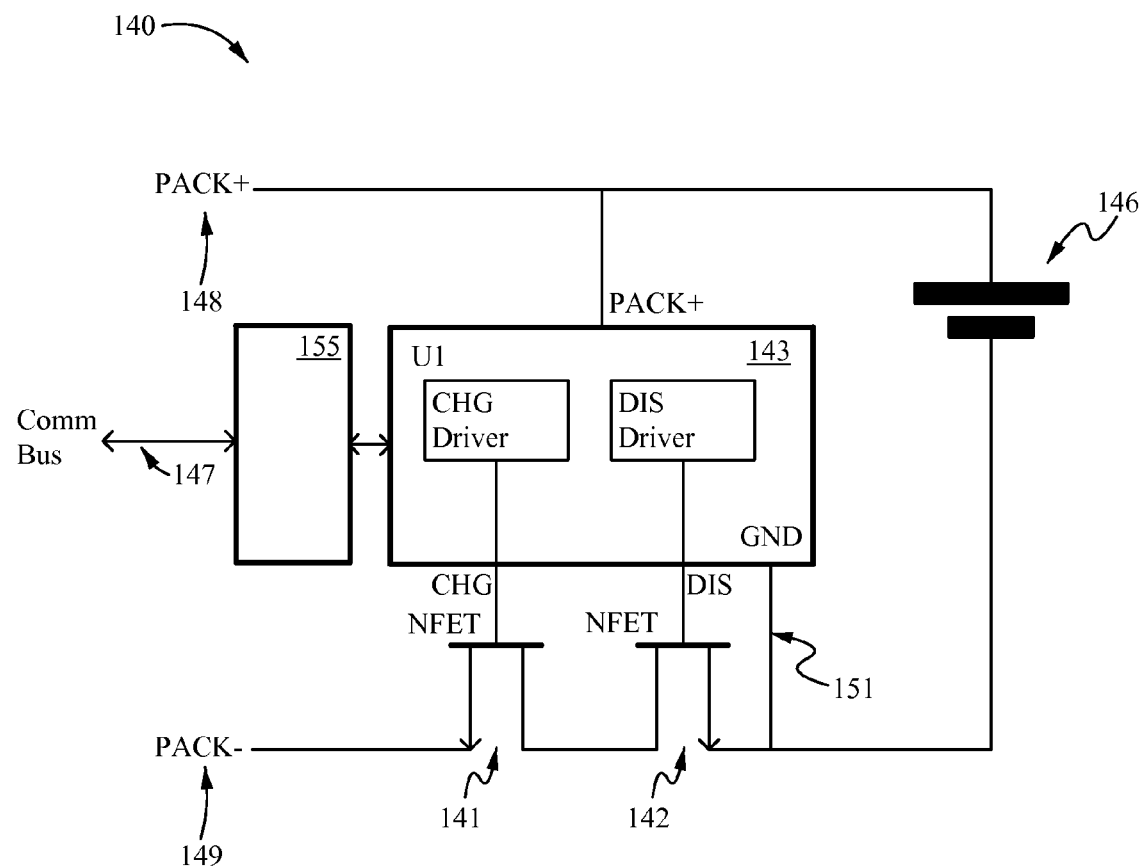
FIG. 1C shows a third prior art schematic diagram of a monitoring circuit.
Figure 2:
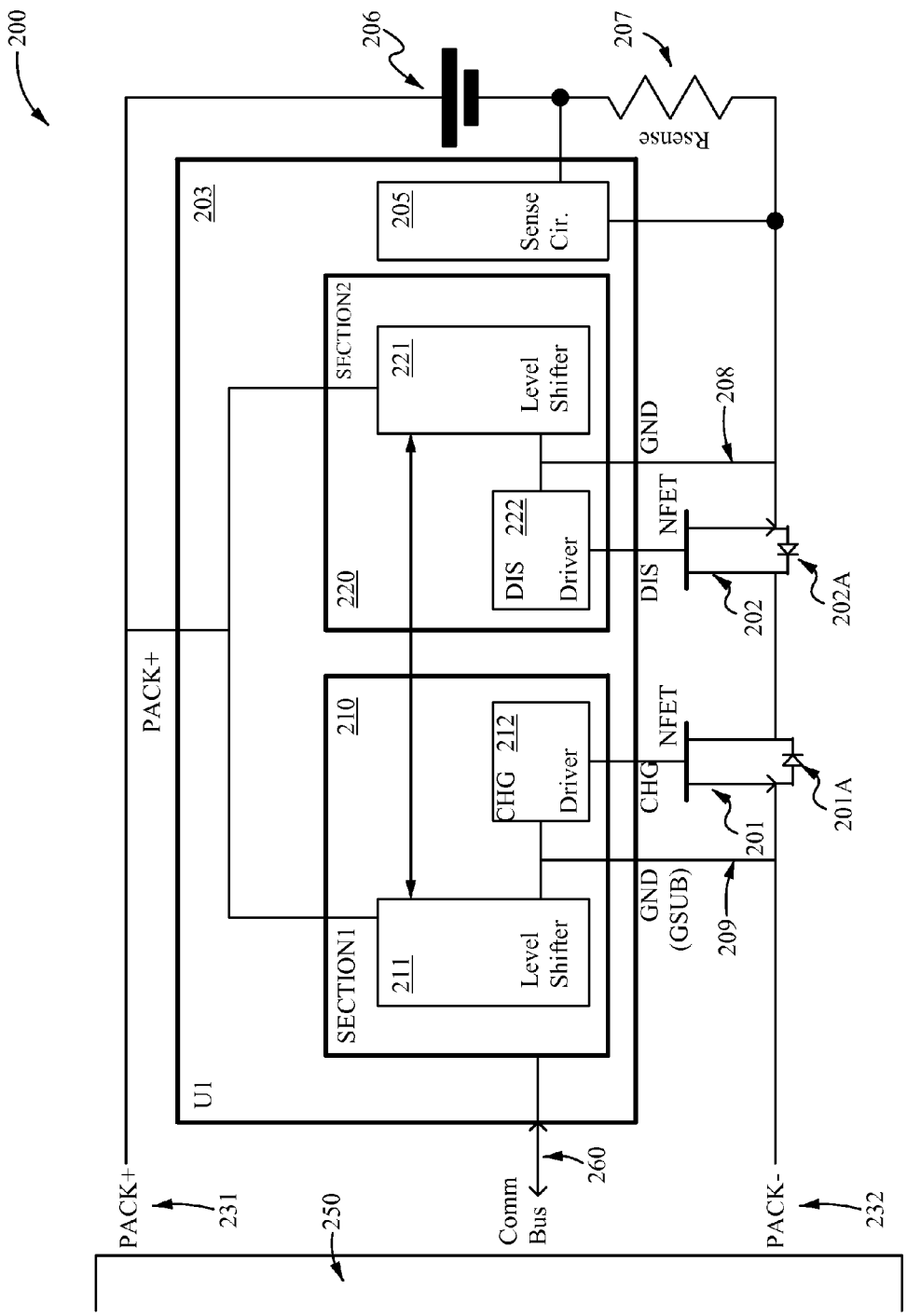
FIG. 2 shows an embodiment of the current invention according to various embodiments of the invention.

FIG. 2 shows an NFET based low side battery protection system 200 in accordance with an embodiment of the invention. The system comprises a monitoring circuit 203, a battery 206, an external circuit 250, a first NFET 201 and a second NFET 202. The circuit 250 can converts AC power from a wall socket (not shown) into a DC source to charge the battery 206 or perform various functions utilizing battery 206 as a voltage source. The monitoring circuit 203 serves to monitor the charge and discharge of the battery 206 to prevent damage to both the battery 206, the circuit 250, and the greater system in which the battery protection system 200 is integrated, such as a cellular phone, a laptop computer, or any other portable device having a battery that is amenable to charging while the battery is still connected to the portable device. In general, the circuit 250 has two power terminals, PACK+ 231 and PACK− 232. The terminal PACK+ 231 functions as a bulk power source, either providing current to the battery 206 in a charge mode or providing current to an external system during a discharge mode. Charge and discharge modes are generally determined by an external supervisory circuit (not shown) within the device that the system 200 is placed into. The supervisory circuit determines whether current must be sourced from the system 200 or sourced to the system 200. The terminal PACK− 232 functions as a bulk ground. PACK− 232 is alternatively a negative power supply. Instructions to switch between a charge and a discharge mode can be communicated to the circuit 203 through a communication bus 260.

In operation, the two NFETs 201 and 202 are driven to an on position for the life of the system, except for certain fault conditions, meaning that there is a closed circuit from PACK+ 231 to the battery 206 through the NFETs 201 and 202 and to PACK− 232. These fault conditions occur either when the current flowing into the positive terminal of the battery 206 exceeds a predetermined threshold or when the current flowing into the negative terminal of the battery 206 exceeds a predetermined threshold.

In some embodiments, such as shown in FIG. 2, a sense circuit 205 is configured to sense the voltage across a known sense resistor, Rsense 207, to determine a rate of charge or discharge of the battery 206. Rsense 207 is able to be a discrete external resistor, an integrated resistor within the monitoring circuit 203, a leadframe within a semiconductor package, or any known resistance that is in series with a terminal of the battery 206 such that the voltage across the Rsense 207 can be measured. Since Rsense 207 is coupled in series with the battery 206, current flowing through the battery 206 must travel through Rsense 207, generating a voltage across Rsense 207 that may easily be measured and compared to a predetermined threshold for safe operation. Alternatively, the sense circuit 205 measures a voltage across the sources of both NFETs 201 and 202 in order to determine a rate of discharge or level of charge in the battery 206. The person of ordinary skill having the benefit of this disclosure will recognize alternate current sensing means and methods.

The monitoring circuit 203 includes two sections, Section 1 210 and Section 2 220. Section 1 210 comprises a first level shifter 211 and a charge driver 212. The charge driver 212 is coupled to the gate of the first NFET 201. Preferably, the charge driver 212 is configured to apply an appropriate drive voltage to the gate of NFET 201 in order to close NFET 201 and effectuate the flow of current from the drain to the source of the NFET 201. Generally, the appropriate voltage preferably exceeds the threshold voltage of the NFET 201 to allow for conduction with the least possible resistance in the path, thereby effectuating maximum efficiency in the system 200. In standard operation, the NFET 201 is closed and current flows freely. In some embodiments, and as shown in FIG. 2, the first level shifter 211 charge driver 212 is referenced to the substrate (not shown) of the monitoring circuit 203 through a substrate connection GSUB. The substrate layer of any integrated circuit is usually the point of lowest voltage potential within the integrated circuit, such as the monitoring circuit 203. Therefore, it is advantageous to reference section 1 210 to the substrate ground to effectuate communication through the communication bus 260. Alternatively, the discharge driver 212 is able to be referenced to the negative terminal of the battery 206 as applications require. In some applications, a substrate switching circuit can be coupled to the substrate of the monitoring circuit 203, the PACK− 232, and the negative terminal of the battery 206 such that a connection of the substrate can be switched between the lower potential of the PACK− 232 and the negative terminal of the battery 206.

The monitoring circuit 203 further comprises a section 2 220. The Section 2 220 comprises a second level shifter 221. The level shifter 221 is referenced to a circuit ground connection 208. In some embodiments, the circuit ground connection 208 is distinct from the substrate battery pack ground 209, 232. As mentioned above, in normal operation, NFETs 201 and 202 are closed and freely conducting. As a result, the substrate battery pack ground 209, 232 and circuit ground 208 are electrically shorted and therefore at the same potential. The Section 2 220 further comprises a discharge driver 222. The discharge driver 222 is coupled to the gate of the second NFET 202. Preferably, the discharge driver 222 is configured to apply an appropriate drive voltage to the gate of NFET 202 in order to close NFET 202 and effectuate the flow of current from the drain to the source of the NFET 202. Similar to the charge driver 212, the discharge driver 222 preferably applies a voltage to the gate of the NFET 202 that exceeds its threshold voltage to effectuate the greatest conduction and lowest resistance from the drain to the source of the NFET 202.

As mentioned above, the NFETs 201 and 202 are generally closed and conducting during the lifetime of the system 200. However, either one or both of the NFETs 201 and 202 may be opened during a fault condition. Which NFET is opened, is determined by the type of fault condition that is present. In general, there are two major fault conditions that the monitoring circuit 203 is configured to suppress: an excess amount of current flowing either into the positive terminal of the battery 206 or into the negative terminal of the battery 206. These fault conditions occur generally during an overcharge current of the battery 206 or a short circuit across the terminals PACK+ 231 and PACK− 232 respectively. Excess voltage on the battery 206 will trigger an overcharge fault that opens NFET 201. Too low voltage on the battery 206 will trigger an over-discharge fault that opens NFET 202. It is possible to have combinations of fault or system modes where both NFETs 201 and 202 are off.

In a condition where there is excess current flowing into the positive terminal of the battery 206, the battery 206 is likely to exceed its charge capacity. Such a condition may cause the battery 206 to be damaged. The battery 206 may also overheat, blister and pop open causing extensive damage to the device the battery 206 is inside, such as a smartphone, or to the user, causing injury. The battery 206 may draw excess current into its positive terminal for a host of reasons, such as a faulty charger. In such a fault condition, the current across Rsense 207 will increase and the voltage across Rsense 207 will increase proportionally. The sense circuit 205 will detect the increase in voltage and the monitoring circuit 203 will recognize the voltage as exceeding a predetermined threshold for safe operation. In such a condition, the sense circuit 205 will communicate the fault condition to the charge driver 212. The charge driver 212 will stop driving the NFET 201, and the NFET 201 will appear as an open circuit. Every MOSFET comprises an inherent or parasitic diode between its source and drain due to the construction of a MOSFET. The diode is formed in the junction between the body and the substrate which are of different doping polarities. The NFET 201 is shown with an inherent diode 201A having its anode at the source and its cathode at the drain. In the fault condition where there is an excess amount of current flowing into the positive terminal of the battery 206, the parasitic diode 201A will be reverse biased and will block all current from completing a loop from PACK+ 231, through the positive terminal of the battery 206 to PACK− 232. As a result, the battery 206 will not be able to be overcharged. Furthermore, because a communication bus 260 is integrated into the monitoring circuit 203, the monitoring circuit 203 is able to communicate the fault condition to an external destination.

Similarly, the monitoring circuit 203 is able to control an over current condition when there is excess current flowing into the negative terminal of the battery 206. Such a fault condition likely will occur when there is a short across PACK+ 231 and PACK− 232. Such a short may occur when there is a short within the device that the battery 206 is placed into due to damage or if the device, such as a smartphone, has reached end of life and device breakdowns cause a short. Also, a short may occur if the battery is not installed within a device, and a foreign conductive object comes into contact with both PACK+ 231 and PACK− 232. A short may cause damage to the battery 206, the monitoring circuit 203, or circuit 250, and may cause sufficient heat to cause injury to a user. During such a fault, there will be a voltage drop across Rsense 207 due to the current flowing into the negative terminal of the battery 206 that will be sensed by the sense circuit 205. If the voltage drop is below a predetermined level, the discharge driver 222 stops driving the NFET 202, causing NFET 202 to become an open circuit. Similar to the NFET 201, a parasitic transistor 202A that exists inherently within NFET 202 becomes reverse biased and will block any current flow into the negative terminal of the battery 206. Also, the monitoring circuit 203 is able to communicate the fault condition to an external recipient through the communication bus 260.

Alternatively, the monitoring circuit 203 is capable of discontinuing driving both NFETs 201 and 202 during any fault condition rather than discontinuing driving either individual NFET depending on the type of fault condition. In some applications, the NFETs 201 and 202 are integrated into a single switching device sharing a common drain.

The monitoring circuit 203 is able to communicate via communication bus 260 with an external recipient, such as a microprocessor or power monitor unit, without error due to the first level shifter 211 and second level shifter 221 referencing the incoming or outgoing signals through the communication bus 260 to the substrate, battery pack ground 209, 232 or circuit ground 208. In general, any type of communications can be transmitted to and from the monitoring circuit 203 via communications bus 260 including, but not limited to, state data, sensed data, and control signals for operating the monitoring circuit including the level shifters and drivers.

In some embodiments, the monitoring circuit 203 and the communication bus 260 are able to communicate and test whether the battery 206 is a genuine OEM part or manufactured by a third party. The device into which the system 200 is placed will be able to determine through communications provided from the monitoring circuit 203 via the communication bus 260 if the battery 206 is a non-genuine battery that may be defectively built and reject the battery 206 as a result.

In operation, the monitoring circuit 203 is placed in a battery charging system between a power source, such as a common wall AC adaptor, and a battery to facilitate proper charge and discharge of the battery. The two NMOS transistors are used as switches to control the flow of current from the power source and battery. The NMOS transistors are coupled to ground by their sources. They are able to be driven, or turned on, without the use of a costly charge pump. The result is a low cost battery charging system with minimal external components capable of communicating the status of a battery or a fault condition with an external recipient.

Although the exemplary embodiments described herein have shown the use of N type MOSFETs, or NFETs, a person of ordinary skill having the benefit of this disclosure will appreciate that any known or application specific switching device may be used, including but not limited to bipolar transistors, IGBTs, JFETs, or any combination thereof. Through general convention, MOSFETs and JFETs have gates, sources and drains, whereas bipolar and IGBTs have bases, collectors and emitters. Those of ordinary skill in the art having the benefit of this disclosure will readily appreciate that bases and gates, collectors and drains, and emitters and sources may be functionally equivalent elements on bipolar/IGBTs and MOSFETs/JFETs respectively. In general, bases and gates are able to be the control terminals of a transistor, wherein a drain-source or collector-emitter are controllable impedance paths for current to pass there through.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A system for monitoring a battery comprising:
   a battery pack having a positive terminal and a negative terminal;
   a communication bus coupled to communicate with an external device;
   a monitoring circuit coupled to the battery, the monitoring circuit monitors a first parameter of the battery, the monitoring circuit being further coupled to the communication bus and compares a communication signal received from the communication bus to a desired reference voltage;
   a first voltage level shifter coupled to the communication bus, the first voltage level shifter changes the reference voltage;
   a first N-type switching device having a control terminal and a first controllable impedance path and being coupled to the monitoring circuit, the first controllable impedance path of the first N-type switching device being coupled to a negative terminal of the battery; and
   a second N-type switching device having a control terminal and a second controllable impedance path and being coupled to the monitoring circuit, the second controllable impedance path of the second N-type switching device being coupled to the first controllable impedance path of the first N-type switching device and the negative terminal of the battery pack;

wherein the communication bus remains communicatively coupled to the external device when the negative terminal of the battery pack is not electrically connected to the negative terminal of the battery.

2. The system of claim 1 wherein the first voltage level shifter is coupled to a negative terminal of the battery pack and the communication bus, wherein the first voltage level shifter senses a first voltage level referenced to the negative terminal of the battery pack; the first voltage level shifter further transfers a second voltage level to a second voltage level shifter referenced to the negative terminal of the battery.

3. The system of claim 2 wherein the first and second voltage levels are equal.

4. The system of claim 2 wherein the communication comparison voltage level is derived from a percentage of the positive terminal of the battery pack and referenced to the negative terminal of the battery pack.

5. The system of claim 2 where the reference voltage level is derived from the first voltage level.

6. The system of claim 2 wherein the monitoring circuit further comprises a charge driver coupled to a control terminal of the first N-type switching device and to the first voltage level shifter, the charge driver applies a drive voltage to the control terminal of the first N-Type switching device referenced to the negative terminal of the battery pack.

7. The system of claim 2 wherein communication bus, the monitoring circuit, the first and second N-type switching devices are located on a substrate layer that is coupled to the negative terminal of the battery pack such that the first voltage level shifter references the first voltage level to the negative terminal of the battery pack.

8. The system of claim 2 wherein the communication bus, the monitoring circuit, the first and second N-type switching devices are located on a substrate layer that is coupled to the negative terminal of the battery such that the first voltage level shifter references the first voltage level to the negative terminal of the battery.

9. The system of claim 2 further comprising a substrate switching circuit coupled to the monitoring circuit and provides selective coupling to the negative terminal of the battery pack or the negative terminal of the battery based on relative voltage potential between the negative terminal of the battery pack and the negative terminal of the battery.

10. The system of claim 2 wherein the monitoring circuit further comprises a discharge driver coupled to the control terminal of the second N-type switching device and to the second voltage level shifter, the discharge driver being configured to apply a drive voltage to the control terminal of the second N-type switching device referenced to the negative terminal of the battery.

11. The system of claim 1 wherein the monitoring circuit comprises a monolithic integrated circuit.

12. The system of claim 11 wherein communication is maintained when the negative terminal of the battery pack is not at the same voltage potential of the negative terminal of the battery.

13. The system of claim 1 wherein the first N-type switching device comprises one of an N type MOSFET, IGBT, JFET, and bipolar transistor.

14. The system of claim 1 wherein the second N-type switching device comprises one of an N type MOSFET, IGBT, JFET, and bipolar transistor.

15. The system of claim 1 wherein the controllable impedance path of the first N-type switching device and the controllable impedance path of the second N-type switching device share one of a common drain.

16. The system of claim 1 wherein the controllable impedance path of the first N-type switching device and the controllable impedance path of the second N-type switching device share one of a common source.

17. The system of claim 1 further comprising a sense circuit, wherein the sense circuit measures a sensed voltage across a sense resistor coupled in series with the negative terminal of the battery pack.

18. The system of claim 1 further comprising a sense circuit, wherein the sense circuit measures a sensed voltage across a sense resistor coupled in series with the positive terminal of the battery pack.

* * * * *